United States Patent Office 2,919,650
Patented Jan. 5, 1960

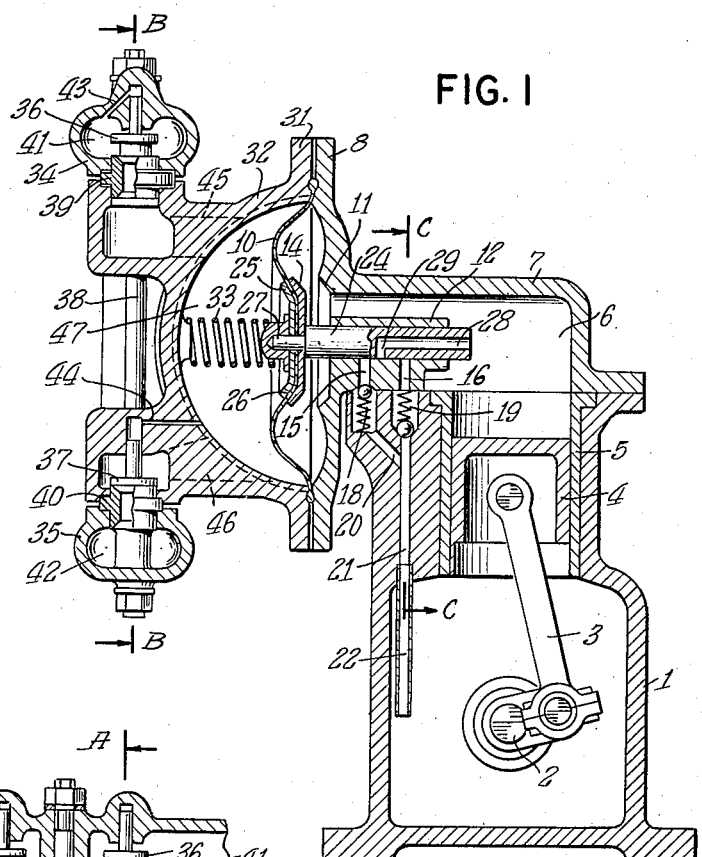
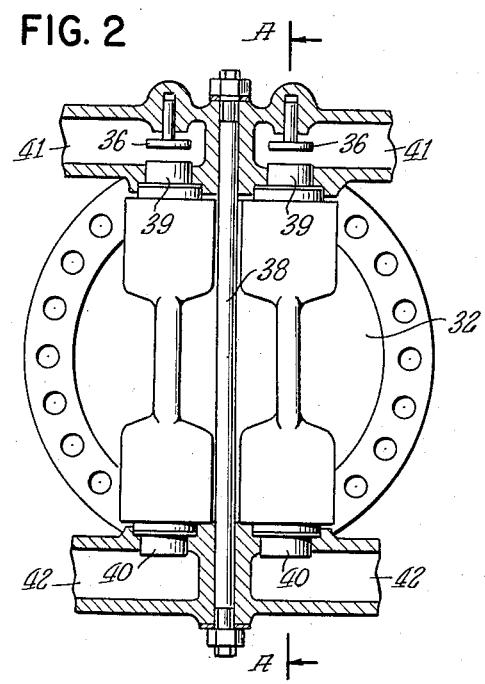
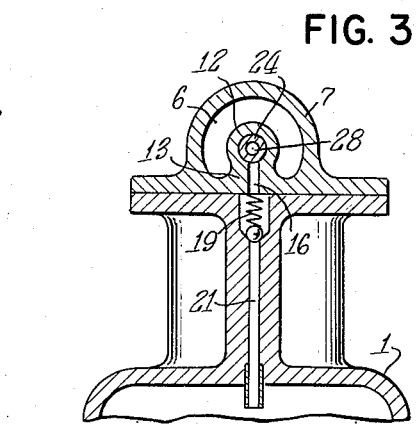
FIG. 1
FIG. 2
FIG. 3

2,919,650

DIAPHRAGM PUMP FOR NON-LUBRICATING AND CHEMICALLY AGGRESSIVE LIQUIDS

Georg Wiggermann, Kressbronn, Germany, assignor of one-half to Walter Reiners, M. Gladbach, Germany Application September 24, 1956, Serial No. 611,450

Claims priority, application Germany September 22, 1955

10 Claims. (Cl. 103—44)

My invention relates to a diaphragm pump in which the medium to be delivered, such as an insecticide or other spray for agricultural purposes, is impelled by a diaphragm driven hydraulically through a body of oil by pressure and suction pulses produced by a reciprocating pump piston.

Such diaphragm-piston pumps are particularly advantageous for delivering chemically-aggressive liquids, because the cylinder for the reciprocating piston, the sensitive control components, and the hydraulic conduits are all protected by the diaphragm from detrimental action by the medium to be impelled.

Proper sealing of the piston, which in such diaphragm pumps is surrounded by oil, is effected by accurate fitting or by means of piston rings. However, it is inevitable that, during the pressure stroke, small amounts of oil will escape along the piston from the stroke space.

The highly elastic diaphragm preferably used in such diaphragm-piston pumps possesses a very slight inherent return force, and the stroke range of diaphragm deflection is dependent upon the quantity of oil located between the diaphragm and the reciprocating piston. If this oil quantity is too large, the stroke range of the diaphragm may become displaced in the pressure-stroke direction to such an extent that the diaphragm material is excessively stressed and damaged. If the oil quantity is too small, the same damage may occur due to excessive stroke displacement in the suction-stroke direction.

An object of my invention is to eliminate this possibility. To this end, I provide between the hydraulic chamber for driving the diaphragm and the oil reservoir or oil sump of the pump a controllable duct connection, and I control this connection in dependence upon movement of the diaphragm and by mechanical control means so that the duct connection forms a communication between the hydraulic chamber and the reservoir only when the diaphragm deflection departs from the normal stroke range. As a result, when the diaphragm-stroke is unduly displaced in the pressure-stroke direction, the excess quantity of oil can escape from the hydraulic chamber into the reservoir; and when the stroke range is excessively displaced in the suction-stroke direction, the shortage of oil in the hydraulic chamber is replenished by induction from the reservoir. The danger of overstressing the diaphragm is thus eliminated.

In diaphragm devices wherein the diaphragm serves for issuing control pulses, it has become known to provide the diaphragm with a rigid center disc for increasing the power output and for protecting the diaphragm material. For the above-mentioned purpose of my invention, and according to another feature, I provide the diaphragm with a similar rigid center disc, and I connect the center disc with one end of a control slider which is displaceably guided in a bore of the pump housing for movement in the stroke direction of the diaphragm. This control slider possesses a longitudinal bore which opens into the stroke-transmitting oil chamber, and a transverse bore which selectively connects the longitudinal bore with one of two stationary oil ducts leading to the oil reservoir. One of the latter ducts is in communication through the longitudinal bore with the hydraulic oil chamber when the diaphragm deflection exceeds the normal stroke range in the suction direction, whereas the other duct communicates with the stroke-transmitting oil chamber only when the diaphragm deflects beyond the normal range in the pressure direction.

According to a more specific feature of my invention, further protection of the diaphragm and increased reliability of its functioning are achieved as follows. When the diaphragm, acting upon the attached control slider, has opened the oil-discharging connecting duct during the pressure stroke, there is the possibility that during the next following suction stroke the reciprocating piston may not suck the diaphragm in the reverse direction but may induct oil from the oil reservoir into the open connecting duct. Similar conditions may occur when the suction stroke of the diaphragm exceeds the normal range. The other connecting duct, when forming a communication between the oil chamber and the oil reservoir of the pump, may permit oil to flow during the next following pressure stroke from the oil chamber to the oil reservoir. To prevent such occurrences, I provide the two control passages coacting with the control slider, with respective check valves so that the two connecting ducts controlled by the slider will pass oil only in the desired directions.

Another possibility of damage to the diaphragm is present if the liquid to be delivered by the pump is supplied to the diaphragm-piston pump under excessive pressure. Similar conditions may also occur when the medium is supplied at excessively low or negative pressure. This may happen, for instance, when the pump is provided with less than three cylinders and, correspondingly, with less than three diaphragms and when the liquid to be delivered by the pump is supplied through pipes of considerable length without air-cushion chambers on the suction side.

In such cases, the deceleration of the column of liquid in the suction pipe occurring at the end of the suction stroke produces a considerable back pressure which acts upon the side of the diaphragm facing the liquid to be delivered. This pressure, if excessive, forces the diaphragm to deflect considerably in the suction-stroke direction so that the diaphragm follows the suction stroke of the piston and thus prevents negative pressure to occur within the hydraulic oil chamber. Hence, any oil depletion in the oil chamber cannot be replenished by induction of oil from the oil reservoir. In consequence, the oil quantity in the hydraulic chamber will gradually decline so that, ultimately, the diaphragm can deflect so far beyond the normal stroke range in the suction direction as to become damaged.

To obviate such trouble, and according to another feature of my invention, I design the center disc of the diaphragm as a valve disc and connect it rigidly with the above-mentioned control slider so that the slider forms the displaceable stem or tappet for the valve disc. When the diaphragm reaches the permissible limit position in the suction-stroke direction, the valve disc seats itself upon a valve seat located on the pump housing or on a part connected therewith. The closed disc valve then separates, from the hydraulic oil chamber, a tightly sealed small oil space immediately adjacent to the diaphragm.

By virtue of these features, the diaphragm, when moving on the suction stroke under excessive pressure of the liquid to be delivered, can be pressed by that liquid only to a point where, at the end of the permissible diaphragm stroke length, the valve disc becomes seated. From that moment on, the body of oil enclosed and sealed between the valve disc and the diaphragm braces and supports the diaphragm against any excessive pressure that, during the continuing suction stroke of the reciprocating piston, may be exerted upon the diaphragm by the liquid being delivered by the pump.

If it should happen that during an occurrence of the type just mentioned the oil in the stroke-transmitting hydraulic chamber is simultaneously depleted, then the reciprocating piston, continuing its stroke in the suction direction after the disc valve is closed, produces a vacuum within the oil chamber, with the effect that the above-described replenishment of the oil quantity will automatically take place, due to oil flowing into the oil chamber from the reservoir through the bores of the control slider.

While the above-mentioned objects and features of my invention afford the production of a diaphragm-piston pump of a heretofore unattained degree of perfection as far as the functioning of the pump is concerned, it is a further object of my invention to also extend the useful lifetime of such a pump even when used for liquids that are highly aggressive chemically with respect to the diaphragm material. Even with the highest-quality diaphragm materials so far available, it has remained infeasible to guarantee absolute faultlessness of pump diaphragms. There is also the possibility of faults or mechanical defects occurring when assembling the pump. Such defects are not always discernible by checking in the factory and may cause leaking of the diaphragm only after the pump has been in use for some time. As a result, the chemically-aggressive, impure and non-lubricating liquid may penetrate through the diaphragm into the oil chamber and may damage the driving components of the pump and make them useless within a relatively short time. It is particularly disadvtangeous if in such cases the occurrence of such damage is not immediately apparent and can be discerned only by careful attention, even when the leakage of the diaphragm has reached larger proportions. It is therefore a more specific object of my invention to also obviate such possibilities of damage.

To this end and in accordance with another feature of my invention I provide the diaphragm-piston pump with a spring which rests against the pump housing and which always imposes, upon the center disc of the diaphragm, a loading in the direction of the suction stroke.

The spring, thus pre-tensioning the diaphragm, is preferably located on the inner side of the diaphragm, namely on the side away from the chemically-aggressive liquid, so that the spring is not subjected to any particular chemical attack. However, the spring can also be made corrosion-resistant and may then be disposed on the diaphragm side of the liquid to be delivered.

By spring-loading or biasing the diaphragm toward the suction-stroke direction in this manner, the oil driving the diaphragm is always kept under slight over-pressure as compared with the pressure of the medium on the delivery side of the diaphragm. This slight excess pressure of the oil, maintained under all operating conditions, prevents the liquid from penetrating through a defective diaphragm into the stroke-transmitting oil chamber. In practice, however, a defective membrane will permit some oil to escape from the hydraulic oil chamber into the medium chamber so that there is a tendency of the oil quantity within the stroke-transmitting oil chamber to become depleted. Now, due to the controlling action of the slide valve and the control ducts leading into the oil reserve space, the oil quantity in the cylinder stroke chamber is continually replenished so that the pump will continue to operate satisfactorily until the oil reserve is exhausted; but if this condition is ever permitted to occur, the reciprocating piston inducts air instead of oil. Since air is compressible, the transmission of driving motion from the reciprocating piston to the diaphragm will simply be discontinued or interrupted if a sufficient quantity of air has collected within the hydraulic oil chamber, but this involves no mechanical damage to the pump.

The above-mentioned oil reservoir is preferably formed by the crankcase of the reciprocating piston pump. The diaphragm-piston pump unit may comprise several diaphragms whose respective delivery strokes have a uniform cyclical sequence. If in the event of a defective diaphragm, such diaphragm permits oil to penetrate for a prolonged period of time from the hydraulic oil chamber into the medium chamber, then the quantity of oil in the crankcase may ultimately decline to such an extent that the crank mechanism and its bearings and other parts to be lubricated may be jeopardized by lack of oil.

In order to prevent this, and in accordance with another feature of my invention, the opening of the connecting conduit between the oil reservoir and the stroke-transmitting oil chamber is located at such height within the oil reservoir that the supply of oil from the reservoir ceases when the oil drops below the safe level required for reliably lubricating the driving mechanism.

When this occurs, the continuously pre-tensioned diaphragm keeps the disc valve continuously closed so that, even if the oil in the hydraulic chamber should be depleted, the medium to be delivered by the pump can never enter into the spaces occupied by the driving and control mechanisms. Any stoppage of diaphragm operation for one of the cylinders of the diaphragm-piston pump manifests itself by jerky delivery of the medium and hence cannot go unobserved.

The above-mentioned and more specific objects, advantages and features of my invention will be more fully understood from the embodiment illustrated by way of example on the drawing in which—

Fig. 1 shows a vertical sectional view of a complete diaphragm-piston pump according to the invention, the section at the left of the diaphragm being taken along the line A—A indicated in Fig. 2, the section on the right of the diaphragm being in the cylinder center plane;

Fig. 2 shows a part sectional view along the line B—B indicated in Fig. 1; and

Fig. 3 shows a sectional view taken along the line C—C indicated in Fig. 1.

The base structure of the pump is formed by a crankcase 1 in which a crankshaft 2 for driving the pump is journalled. A connecting rod 3 links the crankshaft with a vertically reciprocating piston 4 which runs in a cylinder bushing 5. The cylinder space above the piston 4 merges with an oil chamber 6 within a headpiece 7 that is flanged to the cylinder housing portion of the crankcase structure. The headpiece 7 has a flange 8 to which the diaphragm portion of the machine is fastened. The headpiece 7 further forms a valve seat 11 and a valve-shaft guide 12.

The neck portion 13 of the guide 12 (Fig. 3) is traversed by two control ducts 15 and 16 which communicate with respective check valves 18 and 19. Check valve 18 is connected through a passage 20 with a bore 21 leading into the oil reserve chamber of the crankcase 1. The duct 21 is continued by a pipe 22 which terminates approximately at the height of the crankshaft axis. Check valve 18 opens only in the direction toward passage 20. Check valve 19 opens only in the direction toward duct 16.

The diaphragm 10 of the pump is connected with a slide shaft 24 which is displaceable in the above-mentioned guide 12 of headpiece 7. The diaphragm 10 is firmly clamped between two reinforcing center discs 25 and 26 by means of a cap nut 27. The center disc 26 also forms a valve disc 14 for cooperation with the valve seat 11. Slide shaft 24 forms the valve stem or tappet of disc valve 11, 14.

The slide shaft 24 is further provided with an axial and centrally located control bore 28 which opens into the oil chamber 6. Bore 28 merges with a cross bore 29 which, during axial displacement of the slide shaft 24, may enter into registry with duct 15 or duct 16 when the deflecting diaphragm 10 reaches a predetermined limit position during the suction stroke and the pressure stroke respectively.

Secured to flange 8 of headpiece 7 is a housing 32 which forms a receiving chamber for the liquid medium to be delivered by the pump, such as a chemically agressive insecticide or other liquid to be sprayed. The peripheral rim portion of diaphragm 10 is firmly clamped and sealed between the flange 8 and a corresponding flange 31 of the housing 32.

A helical compression spring 33 abuts at one end against the housing 32 and at the other end against the reinforcing disc 25 of the diaphragm assembly, thus exerting upon the diaphragm 10 under all operating conditions a slight biasing force in the direction of the suction stroke. Secured to the housing 32 is a casing 34 for a pressure valve 36, and a casing 35 for the suction valve 37. As is apparent from Fig. 2, each of these two valves is designed as a twin valve. The two valve casings and their respective valve-seat inserts 39 and 40 are tensioned against the housing 32 by means of a single through bolt 38. The medium to be delivered by the pump is supplied through two suction conduits 42 and leaves the pump through two pressure conduits 41.

The pressure and suction valves are provided with respective relief ducts 43 and 44. The medium chamber 47 bordered by the diaphragm in housing 32 is connected by ducts 45 and 46 with the pressure and suction valves respectively.

It is assumed on the drawing that the piston 4 is just moving upwardly on a pressure stroke. Since the oil chamber 6 between diaphragm 10 and piston 4 is completely filled with oil, the pressure impulse of the piston 4 is transmitted to the diaphragm 10 and thus to the liquid medium in diaphragm chamber 47. The medium is then delivered through ducts 45 and valves 36 into the pressure conduits 41.

Since the diaphragm 10 has a larger active diameter than the piston 4, the diaphragm and the slide shaft 24 perform a smaller stroke than the piston. The diaphragm and slide shaft are shown in Fig. 1 shortly ahead of the normal limit position in the pressure-stroke direction. In this position of the diaphragm, and generally between the permissible limit positions during pressure and suction strokes, there is no communication between the cross bore 29 of slide shaft 24 and either one of the ducts 15 and 16.

If oil depletion occurs in the oil chamber 6, the diaphragm stroke becomes displaced in the suction direction (to the right in Fig. 1). Under such conditions, when the permissible stroke limit is reached, the cross bore 29 will register with the channel 16. As a result, the suction stroke of the piston 4 causes oil to be inducted from the oil reserve in crankcase 1 through pipe 22, bore 21, check valve 19, duct 16, bores 29 and 28 into the oil chamber 6, thus replenishing the quantity of oil in chamber 6 until the normal stroke range of the diaphragm 10 is reestablished.

If the oil chamber 6 contains an excessive quantity of oil, the diaphragm stroke becomes displaced in the pressure-stroke direction (toward the left in Fig. 1). However, before the diaphragm stroke can exceed the permissible range, bore 29 will register with duct 15 so that now the excess quantity of oil can pass through check valve 18 into the oil reservoir during the pressure stroke of piston 4.

The above-described control operations, as explained previously in this specification, have the effect of protecting the diaphragm from being damaged or destroyed by excessive mechanical stresses in the compression or suction direction.

Now assume that an excessive pressure occurs in the diaphragm chamber 47 on the medium side of the diaphragm, i.e. the left side, so that the sufficiently low or negative pressure required for oil replenishment cannot build up within the oil chamber 6. In this event, the diaphragm is protected from exceeding the permissible stroke limit in the direction of the suction stroke by the valve disc 14 now being forced against the valve seat 11. Valve 11, 14 thus closes and seals the oil chamber 6 from the oil-filled space immediately adjacent to the diaphragm 10. The enclosed and sealed oil cushion between the valve seat and the diaphragm then braces the diaphragm during the suction stroke of the piston against any excess pressure that may prevail on the medium side, in chamber 47, of the diaphragm.

Under the just mentioned conditions, the cross bore 29 in slide shaft 24 communicates with duct 16 so that, even though valve 11, 14 is closed, any oil depletion that may occur in chamber 6 is eliminated by supply of oil through check valve 19 during the suction stroke of the piston.

In all operating conditions, the pressure spring 33 exerts a slight biasing force upon the diaphragm in the direction of the suction stroke. As a result, in the event of any porosity or leakage of the diaphragm, none of the medium can penetrate from the diaphragm chamber 47 to the oil side of the diaphragm. When the valve 11, 14 is closed the biasing effect of spring 33 is ineffective, but then the sensitive control and driving components located on the oil side of the diaphragm remain protected because the valve 11, 14 now separates these components from the injurious medium being pumped.

As mentioned above, a defective diaphragm may cause depletion of oil in chamber 6. As also explained, the missing quantity of oil is then sucked in from the oil reserve in the crankcase 1. This may have the effect of excessively reducing the oil reserve so that the driving mechanism may become damaged for lack of oil. For that reason, the pipe 22, whose lower end is immersed into the oil reserve, reaches down only to approximately the height of the crankshaft axis so that the oil is always maintained up to a safe minimum level.

When the oil in the stroke-transmitting chamber 6 is depleted, particularly when the depletion has reached a stage where the pump inducts air, the pre-tensioned spring 33 operates to keep the valve 11, 14 closed continuously.

In cases where it is necessary to remove the diaphragm housing 32 from the flange 8 of the headpiece 7, for instance for exchanging the diaphragm or making other repairs, there is the possibility of keeping the valve 11, 14 closed in order to keep the liquid medium away from the oil chamber 6. When the biasing spring 33 is located on the oil side of the diaphragm, for instance so that it will act between slide shaft 24 and guide 12, the valve 11, 14 remains automatically closed under the effect of the biasing spring whenever the diaphragm housing 32 or the diaphragm is disassembled from the crankcase portion of the pump.

It will be obvious to those skilled in the art, upon a study of this disclosure, that diaphragm-piston pumps according to my invention permit of various alterations and modifications in over-all design as well as with respect to the design and interconnection of the individual components, and hence may be embodied in specific machines other than the one particularly illustrated and described herein, without departing from the essential features of my invention and within the scope of the claims annexed hereto.

I claim:

1. A diaphragm pump, comprising a housing and a diaphragm forming together a variable-volume space for liquid to be pumped, a reciprocating drive for said diaphragm, structure forming an hydraulic oil chamber connecting said drive with said diaphragm and containing hydraulic liquid comprising lubricating oil for transmitting driving motion to said diaphragm, a casing for said drive containing lubricating oil to lubricate parts of the drive, said casing forming an hydraulic-liquid reservoir, duct means connecting said chamber with said reservoir, a rigid center plate firmly joined with said diaphragm in coaxial relation thereto, a slide member movable in the direction of deflection of said diaphragm and joined with said center plate, said duct means comprising two passages leading to the reservoir, the passages being mutually spaced in the direction of diaphragm deflection, said slide member forming a closure for said duct means and having a passage in registry with one of said two passages of the duct means at a time so as to form a communication between said chamber and said reservoir only when said slide member is displaced beyond a given, normal range of displacement in the suction and pressure strokes of the pump.

2. A diaphragm pump, comprising a housing and a diaphragm forming together a variable-volume space for liquid to be pumped, a reciprocating piston for driving said diaphragm, a chamber structure located between said piston and said diaphragm and containing hydraulic liquid for the transmission of driving motion to said diaphragm, said diaphragm having a normal deflective stroke range between two given limit positions, a hydraulic-liquid reservoir, two controllable ducts extending between said chamber and said reservoir, a valve mechanism having a member closing said two ducts when the deflection of said diaphragm is within said normal range, said member being connected with said diahpragm to be displaced relative to said ducts in dependence upon deflecting motion of said diaphragm, said member forming a passage from said chamber to said reservoir through one of said ducts when the diaphragm deflection reaches one of said limit positions, said member forming a passage from said reservoir to said chamber through said other duct when the diaphragm deflection reaches said other limit position, and check valves located in said respective passages and having mutually inverse checking directions so that hydraulic liquid can flow through said one duct only during the pressure stroke of said piston and can flow through said other duct only during the suction stroke of said piston.

3. A diaphragm pump according to claim 1, comprising a helical spring disposed in coaxial relation to said center plate and having a fixed end and a movable end of which the latter is adjacent to said diaphragm, said spring having relative to said diaphragm a force directed toward the piston side of said chamber.

4. A diaphragm pump, comprising a housing and a diaphragm forming together a variable-volume space for liquid to be pumped, a reciprocating drive for said diaphragm, structure forming an hydraulic chamber connecting said drive with said diaphragm and containing hydraulic liquid for transmitting driving motion to said diaphragm, an hydraulic-liquid reservoir, duct means connecting said chamber with said reservoir, a rigid center plate firmly joined with said diaphragm in coaxial relation thereto, a slide member movable in the direction of deflection of said diaphragm and joined with said center plate, said slide member forming a closure for said duct means and having a passage in registry with said duct means as so to form a communication between said chamber and said reservoir only when said slide member is displaced beyond a given, normal range of displacement, said diaphragm pump further comprising a disc valve located in said chamber in coaxial relation to, and in proximity of, said diaphragm, and partitioning when closed a sealed diaphragm-adjacent liquid-filled space from said chamber, said disc valve having a stationary valve seat and having a valve disc formed by said center plate and engageable with said valve seat when said diaphragm and said slide member are displaced in the suction-stroke direction beyond said normal range.

5. A diaphragm pump, comprising a housing and a diaphragm forming together a variable-volume space for liquid to be pumped, a reciprocating drive for said diaphragm, structure forming an hydraulic chamber connecting said drive with said diaphragm and containing hydraulic liquid for transmitting driving motion to said diaphragm, the diaphragm being force-biased toward the hydraulic chamber, an hydraulic-liquid reservoir, duct means connecting said chamber with said reservoir, a member movable in the direction of deflection of said diaphragm and joined with said center plate, said member forming a closure for said duct means and having a passage in registry with said duct means so as to form a communication between said chamber and said reservoir only when said slide member is displaced beyond a given, normal range of displacement in the suction and the pressure strokes of the pump, means comprising a valve located in said hydraulic chamber and partitioning, when closed, a sealed, diaphragm-adjacent, liquid-filled space from said chamber, said valve having closure means operable to seal said space from said chamber when said diaphragm and said slide member are displaced in the suction-stroke direction beyond said normal range.

6. A diaphragm pump comprising enclosure structure, a diaphragm mounted in and dividing said structure, an hydraulic chamber provided by said structure and communicating with the suction-stroke side of the diaphragm, means for delivering pulsations of hydraulic liquid through said chamber to reciprocate the diaphragm, the diaphragm being spring-biased toward the hydraulic chamber, a reservoir for hydraulic liquid, a pumping chamber provided by said structure on the opposite, pressure stroke, side of the diaphragm, the pumping chamber providing a variable-volume space and having valved inlet and outlet means for liquid to be pumped, a slide member operatively connected to the diaphragm on the suction-stroke side thereof, a longitudinal bore in said slide member in communication with the hydraulic chamber throughout the pressure and suction strokes of the diaphragm, the slide having a side opening communicating with the bore, two passages mutually longitudinally spaced and communicating with the liquid in the reservoir, spring-pressed valves for the passages, the valve for the passage closer to the diaphragm, that is closer to the pressure-stroke side, being openable by liquid pressure in the hydraulic chamber when the side opening of the slide member is in communication therewith, this occurring when the limit position of the diaphragm stroke is displaced in the pressure-stroke direction by presence of an excessive amount of the hydraulic liquid in the hydraulic chamber, the valve for the other of the two passages being openable, when the said side opening is in communication therewith, by suction-induced flow of liquid from the reservoir to the hydraulic chamber taking place when the limit position of the diaphragm stroke in the suction-stroke direction is caused to be displaced in that direction by occurrence of depletion of hydraulic fluid in the hydraulic chamber, said structure providing a passageway communicatively connecting the hydraulic chamber with the suction-stroke side of the diaphragm to deliver said pulsations, valve means operatively connected to the diaphragm and the slide member to close said passageway to seal off the diaphragm from said chamber when the diaphragm and said slide member are displaced in the suction-stroke direction beyond the normal range.

7. A diaphragm pump comprising enclosure structure, a diaphragm mounted in and dividing said structure, an hydraulic chamber provided by said structure and communicating with the suction-stroke side of the diaphragm, means for delivering pulsations of hydraulic liquid through said chamber to reciprocate the diaphragm, the diaphragm being spring-biased toward the hydraulic chamber, a reservoir for hydraulic liquid, a pumping chamber provided by said structure on the opposite, pressure stroke, side of the diaphragm, the pumping chamber providing a variable-volume space and having valved inlet and outlet means for liquid to be pumped, a slide member operatively connected to the diaphragm on the suction-stroke side thereof, a longitudinal bore in said slide member in communication with the hydraulic chamber throughout the pressure and suction strokes of the diaphragm, the slide having a side opening communicating with the bore, two passages mutually longitudinally spaced and communicating with the liquid in the reservoir, spring-pressed valves for the passages, the valve for the passage closer to the diaphragm, that is closer to the pressure-stroke side, being openable by liquid pressure in the hydraulic chamber when the side opening of the slide member is in communication therewith, this occurring when the limit position of the diaphragm stroke is displaced in the pressure-stroke direction by presence of an excessive amount of the hydraulic liquid in the hydraulic chamber, the valve for the other of the two passages being openable, when the said side opening is in communication therewith, by suction-induced flow of liquid from the reservoir to the hydraulic chamber taking place when the limit position of the diaphragm stroke in the suction-stroke direction is caused to be displaced in that direction by occurrence of depletion of hydraulic fluid in the hydraulic chamber, said structure providing a passageway communicatively connecting the hydraulic chamber with the suction-stroke side of the diaphragm to deliver said pulsations, valve means operatively connected to the diaphragm and the slide member to close said passageway to seal off the diaphragm from said chamber when the diaphragm and said slide member are displaced in the suction-stroke direction beyond the normal range, said means for delivering pulsations including a piston and a crank-shaft to drive it, said enclosure structure including a crank-case for the crank-shaft, containing lubricating oil, the crank-case being the said reservoir, the oil being the said hydraulic fluid, the said two passages being in communication with a body of oil in the crank-case.

8. A diaphragm pump comprising enclosure structure, a diaphragm mounted in and dividing said structure, an hydraulic chamber provided by said structure and communicating with the suction-stroke side of the diaphragm, means for delivering pulsations of hydraulic liquid through said chamber to reciprocate the diaphragm, the diaphragm being resiliently force-biased toward the hydraulic chamber, a reservoir for hydraulic liquid, a pumping chamber provided by said structure on the opposite, pressure stroke, side of the diaphragm, the pumping chamber providing a variable-volume space and having inlet and outlet means for liquid to be pumped, the diaphragm having a member operatively connected for movement therewith, the member providing a passageway having an opening in communication with the hydraulic chamber, the member having a second opening communicating with the said passageway, two valved passages mutually longitudinally spaced and communicating with the liquid in the reservoir, the valve of the passage closer to the diaphragm, that is closer to the pressure-stroke side, being openable by liquid pressure in the hydraulic chamber when the said second opening of the member is in communication therewith, this occurring when the limit position of the diaphragm stroke is displaced in the pressure-stroke direction by presence of an excessive amount of the hydraulic liquid in the hydraulic chamber, the valve of the other of the two passages being openable, when the said second opening is in communication therewith, by suction-induced flow of liquid from the reservoir to the hydraulic chamber taking place when the limit position of the diaphragm stroke is caused to be displaced in the suction-stroke direction by occurrence of depletion of hydraulic fluid in the hydraulic chamber, said structure providing a passageway communicatively connecting the hydraulic chamber with the suction-stroke side of the diaphragm to deliver said pulsations, valve means operatively connected to the diaphragm and the member to close said passageway to seal off the diaphragm from said chamber when the diaphragm and said member are displaced in the suction-stroke direction beyond the normal range.

9. A diaphragm pump comprising enclosure structure, a diaphragm mounted in and dividing said structure, an hydraulic chamber provided by said structure and communicating with the suction-stroke side of the diaphragm, means for delivering pulsations of hydraulic liquid through said chamber to reciprocate the diaphragm, the diaphragm being resiliently force-biased toward the hydraulic chamber, a reservoir for hydraulic liquid, a pumping chamber provided by said structure on the opposite, pressure stroke, side of the diaphragm, the pumping chamber providing a variable-volume space and having inlet and outlet means for liquid to be pumped, the diaphragm having a member operatively connected for movement therewith, the member providing a passageway having an opening in communication with the hydraulic chamber, the member having a second opening communicating with the said passageway, two valved passages mutually longitudinally spaced and communicating with the liquid in the reservoir, the valve of the passage closer to the diaphragm, that is closer to the pressure-stroke side, being openable by liquid pressure in the hydraulic chamber when the said second opening of the member is in communication therewith, this occurring when the limit position of the diaphragm stroke is displaced in the pressure-stroke direction by presence of an excessive amount of the hydraulic liquid in the hydraulic chamber, the valve of the other of the two passages being openable, when the said second opening is in communication therewith, by suction-induced flow of liquid from the reservoir to the hydraulic chamber taking place when the limit position of the diaphragm stroke is caused to be displaced in the suction-stroke direction by occurrence of depletion of hydraulic fluid in the hydraulic chamber.

10. A diaphragm pump comprising enclosure structure, a diaphragm mounted in and dividing said structure, an hydraulic chamber provided by said structure and communicating with the suction-stroke side of the diaphragm, means for delivering pulsations of hydraulic liquid through said chamber to reciprocate the diaphragm, the diaphragm being resiliently force-biased toward the hydraulic chamber, a reservoir for hydraulic liquid, a pumping chamber provided by said structure on the opposite, pressure stroke, side of the diaphragm, the pumping chamber providing a variable-volume space and having inlet and outlet means for liquid to be pumped, the diaphragm having a member operatively connected for movement therewith, the member providing a passageway having an opening in communication with the hydraulic chamber, the member having a second opening communicating with the said passageway, two valved passages mutually longitudinally spaced and communicating with the liquid in the reservoir, the valve of the passage closer to the diaphragm, that is closer to the pressure-stroke side, being openable by liquid pressure in the hydraulic chamber when the said second opening of the member is in communication therewith, this occurring when the limit position of the diaphragm stroke is displaced in the pressure-stroke direction by presence of an excessive amount of the hydraulic liquid in the hydraulic chamber, the valve of the other of the two passages being openable, when the said second opening is in communication therewith, by suction-induced flow of liquid from the reservoir to the hydraulic chamber taking place when the limit position of the diaphragm stroke is caused to be displaced in the suction-stroke direction by occurrence of depletion of hydraulic fluid in the hydraulic chamber, said means for delivering pulsations including a piston and a crank-shaft to drive it, said enclosure structure including a crank-case for the crank shaft, containing lubricating oil, the crank-case being the said reservoir, the oil being the said hydraulic fluid, the said two passages being in communication with a body of oil in the crank-case.

References Cited in the file of this patent

UNITED STATES PATENTS

| | | |
|---|---|---|
| 900,357 | Davis | Oct. 6, 1908 |
| 1,627,257 | Stevens | May 3, 1927 |
| 1,650,377 | Nixon | Nov. 22, 1927 |
| 1,782,144 | Jensen | Nov. 18, 1930 |
| 1,927,587 | Hacker | Sept. 19, 1933 |
| 2,506,434 | Quimper | May 2, 1950 |